US010687591B2

(12) United States Patent
Arai et al.

(10) Patent No.: US 10,687,591 B2
(45) Date of Patent: Jun. 23, 2020

(54) FASTENER STRINGER AND SLIDE FASTENER

(71) Applicant: YKK Corporation, Tokyo (JP)

(72) Inventors: Takumi Arai, Toyama (JP); Yoshihiro Kohsaka, Toyama (JP); Takahiko Aoki, Toyama (JP); Takashi Mori, Toyama (JP)

(73) Assignee: YKK Corporation (JP)

( * ) Notice: Subject to any disclaimer, the term of this patent is extended or adjusted under 35 U.S.C. 154(b) by 59 days.

(21) Appl. No.: 15/869,449

(22) Filed: Jan. 12, 2018

(65) Prior Publication Data

US 2018/0132573 A1    May 17, 2018

Related U.S. Application Data

(62) Division of application No. 15/312,099, filed as application No. PCT/JP2014/064785 on Jun. 3, 2014, now Pat. No. 10,194,720.

(51) Int. Cl.
  *A44B 19/42*      (2006.01)
  *B29D 5/06*       (2006.01)
  (Continued)

(52) U.S. Cl.
  CPC .............. *A44B 19/42* (2013.01); *A44B 19/406* (2013.01); *A44B 19/50* (2013.01); *B29D 5/06* (2013.01);
  (Continued)

(58) Field of Classification Search
  CPC ....... A44B 19/42; A44B 19/50; A44B 19/406; A44B 19/12; B29D 5/06; Y10T 29/49782
  See application file for complete search history.

(56) References Cited

U.S. PATENT DOCUMENTS 2,919,482 A * 1/1960 Casson .................. A44B 19/12
                                                         24/391
3,906,595 A    9/1975 Moertel
(Continued)

FOREIGN PATENT DOCUMENTS

DE         3413253 A1    10/1985
DE         3413253 C2    10/1985
(Continued)

OTHER PUBLICATIONS

U.S. Appl. No. 15/312,099 , Notice of Allowance, dated Sep. 24, 2018, 8 pages.
(Continued)

*Primary Examiner* — Robert Sandy
*Assistant Examiner* — Louis A Mercado
(74) *Attorney, Agent, or Firm* — Kilpatrick Townsend & Stockton LLP

(57) ABSTRACT

A monofilament having, in cross section, a first width and a second width being orthogonal to the first width and being greater than the first width is helically wound about the circumference surface of the mandrel. Each helical unit included in the configured helix of the monofilament includes a pair of legs, a first coupling portion coupled between said pair of legs, and a second coupling portion coupled between one leg of said pair of legs and the other leg of a pair of legs in an adjacent helical unit. The second width of said first coupling portion is oriented along the axial direction of the mandrel. The first coupling portion in each helical unit in the helix is pressed such that the second width of the first coupling portion is widened in its width direction, thereby forming an engagement head.

12 Claims, 11 Drawing Sheets

(51) Int. Cl.
*A44B 19/50* (2006.01)
*A44B 19/40* (2006.01)
*A44B 19/12* (2006.01)

(52) U.S. Cl.
CPC ......... *A44B 19/12* (2013.01); *Y10T 29/49782* (2015.01)

(56) References Cited

U.S. PATENT DOCUMENTS

| | | | |
|---|---|---|---|
| 3,946,465 A * | 3/1976 | Moertel | A44B 19/12 24/394 |
| 4,084,297 A | 4/1978 | Frohlich et al. | |
| 4,149,569 A | 4/1979 | Frohlich | |
| 4,386,043 A | 5/1983 | Takeshima | |
| 4,989,300 A * | 2/1991 | Fukuroi | A44B 19/12 24/391 |
| 5,043,125 A | 8/1991 | Fukuroi | |
| 5,058,246 A | 10/1991 | Fujisaki | |
| 5,142,747 A | 9/1992 | Matsushima | |
| 6,302,676 B1 | 10/2001 | Kato et al. | |
| 2017/0071295 A1 | 3/2017 | Arai et al. | |

FOREIGN PATENT DOCUMENTS

| | | |
|---|---|---|
| GB | 981511 A | 1/1965 |
| GB | 1296083 A | 11/1972 |
| JP | 36-003037 B1 | 4/1961 |
| JP | 56-000044 B2 | 1/1981 |
| JP | 04-064302 A | 2/1992 |
| JP | 2000-094535 A | 4/2000 |

OTHER PUBLICATIONS

International Search Report, PCT International Patent Application No. PCT/JP2014/064785, dated Aug. 19, 2014.
Restriction Requirement, U.S. Appl. No. 15/312,099, dated Nov. 22, 2017.
Non-Final Office Action, U.S. Appl. No. 15/312,099, dated Mar. 9, 2018.
International Preliminary Report on Patentability, PCT International Patent Application No. PCT/JP2014/064785, dated Dec. 15, 2016.

* cited by examiner

500

US 10,687,591 B2

FASTENER STRINGER AND SLIDE FASTENER

This application is a divisional patent application of U.S. application Ser. No. 15/312,099, now U.S. Pat. No. 10,194,720, which is a national stage application of PCT/JP2014/064785, both of which are incorporated herein by reference.

TECHNICAL FIELD

The present disclosure relates to a method of producing a fastener element, an apparatus for producing the same, and a product. The product maybe a fastener stringer or a slide fastener.

BACKGROUND ART

Patent literature 1 discloses a method and apparatus for producing a helical fastener element from a monofilament made of a synthetic resin. As shown in FIG. 2 of the patent literature 1, a monofilament 4 is supplied to a mandrel 21 and, based on the actuation of a screw 22 illustrated in two-dots broken line, the monofilament is helically wound about the circumference surface of the mandrel 21 along the axial direction of the mandrel 21. An engagement head is formed by an engagement-head shaping circular plate 23b, arranged adjacent to the mandrel 21, with the corporation of a die 23a. Additionally to this configuration, means for shaping a leg is provided in patent literature 1.

Patent literature 2 describes, at column 1, lines 65-67, that its one object to increase the flexibility of a slide fastener without lowing the strength of the slide fastener and, describes that a pair of monofilaments of oval shape are wound about a common mandrel so that their shapes are fixed, as an embodiment. The same literature describes, at column 3, lines 57-67, that the engagement element 12 is slightly longer along the longitudinal axis as shown in FIG. 13 of the same literature, describing that this is due to an apparatus for winding a coil. As would be understood from FIG. 2 and FIG. 24 of the same literature, a coupled portion 18 of one filament is disposed on another filament.

Patent literature 3 discloses a technique in which a fastener tape is weaved while a fastener element being incorporated into the fastener tape. As shown in FIG. 19 of the same literature, a shaping roll 118 which is for flattening a monofilament 106 of synthetic resin is incorporated into a loom. The same literature describes, at FIG. 13 and column 10, lines 7-10, that a monofilament of a circular cross-section is flattened successively by a rolling unit 15 such that a substantially oval cross-section is given thereto.

Patent literature 4 also discloses a producing technique similar to the patent literature 3.

CITATION LIST

Patent Literature

[PTL 1] Japanese Patent Application Laid-open No. 2000-094535
[PTL 2] The U.S. Pat. No. 3,906,595 Specification
[PTL 3] Japanese Examined Patent Application Laid-open No. 56-000044
[PTL 4] Germany Patented Invention No. 3413253 Specification

SUMMARY OF INVENTION

Technical Problem

It has been demanded to facilitate the reduced weight of a slide fastener in response to a demand of the reduced weight of clothes. Components of a slide fastener may include a fastener tape, a fastener element, a fastener slider, a stop and so on, and thus reducing the weight of the respective components might be firstly considered. However, it might be hard to devise an effective solution because it is highly demanded to secure fundamental capabilities of a slide fastener, ex. an endurance thereof, an ability to maintain the closed state, an ability to endure a considerable times of opening and closing and the like. It has been demanded to facilitate the reduced weight of a slide fastener while suppressing the sacrifices in capabilities of a slide fastener.

Solution to Problem

A method of producing a helical fastener element (912) from a single monofilament (10) according to an aspect of the present invention may include:

helically winding a flattened single monofilament (10) about the circumference surface of a mandrel (241) along the axial direction of the mandrel (241), said flattened single monofilament (10) having, in cross section, a first width (W11) and a second width (W12) being orthogonal to the first width (W11) and being greater than the first width (W11), so that a helix of the monofilament (10) is configured in which each helical unit in said helix includes a pair of legs (13), a first coupling portion (14) coupled between said pair of legs (13), and a second coupling portion (15) coupled between one leg of said pair of legs (13) and the other leg of a pair of legs (13) in an adjacent helical unit, and so that at least the second width (W12) of said first coupling portion (14) is oriented along the axial direction of the mandrel (241); and pressing the first coupling portion (14) in each helical unit in the helix of the monofilament (10) to form an engagement head (16) that has a third width (W13) that is a widened width of the second width (W12) of the first coupling portion (14) in the width direction of the second width (W12).

In some embodiments, the said method may further include pressing a monofilament (10) having a circular shape in cross section between a pair of rolls (221, 222) so that said flattened monofilament (10) is obtained.

In some embodiment, the monofilament (10) may be helically wound about the mandrel (241) while a core thread (20) is supplied to a groove at the mandrel (241), the groove extending in the axial direction of the mandrel (241).

In some embodiments, the flattened monofilament (10) may include one or more flat surfaces (12), and wherein said flat surface (12) of the flattened monofilament (10) touches the circumference surface of the mandrel (241) when the flattened monofilament (10) is wound about the mandrel (241).

In some embodiments, the flattened monofilament (10) may have a flattened shape in which a pair of flat surfaces (12) are formed at the opposite sides.

Also disclosed is a method of producing a fastener stringer, including:

producing a fastener element (912) in accordance with any one of said above methods; and sewing the produced fastener element (912) onto a fastener tape (911) using a thread.

An apparatus that produces a helical fastener element (912) from a monofilament (10) according to another aspect of the present invention may include:

a flattening unit (220) that flattens the monofilament (10) such that the monofilament (10) includes, in cross section, a first width (W11) and a second width (W12) being orthogonal to the first width (W11) and being greater than the first width (W11);

a mandrel (241) to which the monofilament (10) flattened by the flattening unit (220) is supplied and about which the supplied monofilament (10) is helically wound along the axial direction of the mandrel (241), wherein each helical unit included in a helix of the monofilament (10) configured at said mandrel (241) includes a pair of legs (13), a first coupling portion (14) coupled between said pair of legs (13), and a second coupling portion (15) coupled between one leg of said pair of legs (13) and the other leg of a pair of legs (13) in an adjacent helical unit, and wherein the second width (W12) of the first coupling portion (14) is oriented along the axial direction of the mandrel (241); and a head forming unit (249) that presses the first coupling portion (14) in each helical unit in the helix of the monofilament (10) to form an engagement head (16) that has a third width (W13) that is a widened width of the second width (W12) of the first coupling portion (14) in the width direction of the second width (W12).

In some embodiments, the second width (W12) of the first coupling portion (14) may be oriented along the axial direction of the mandrel (241) based on the relative position between the flattening unit (220) and the mandrel (241).

In some embodiments, the flattening unit (220) may include at least one pair of rolls (221, 222), and wherein the monofilament (10) is pressed between the pair of rolls (221, 222).

In some embodiments, said apparatus may further may include one or more screws (245, 246) in which a rotational axis is arranged parallel to the axial direction of the mandrel (241), wherein the screw (245, 246) comprises a helical vane, and wherein the monofilament (10) is helically transferred about the mandrel (241) by the rotation of the screw.

In some embodiments, a core thread (20) may be supplied to the mandrel (241), and wherein the core thread (20) is arranged inside the helix of the monofilament (10) as a result of the monofilament (10) being wound about the mandrel (241).

A fastener stringer according to still another aspect of the invention may include:

an elongated fastener tape (911); and a fastener element (912) extending along the elongation direction of the fastener tape (911) and sewn to the side-edge portion of the fastener tape (911), the fastener element (912) comprising a helix of a monofilament (10) in which the monofilament (10) is helically wound along the elongation direction of the fastener tape (911), and each helical unit included in the helix of the monofilament (10) including a pair of legs (13), an engagement head (16) coupled between said pair of legs (13), and a reversed portion (15) coupled between one leg of said pair of legs (13) and the other leg of a pair of legs (13) in an adjacent helical unit, wherein the monofilament (10) includes, in cross section, a first width (W11) and a second width (W12) being orthogonal to the first width (W11) and being greater than the first width (W11), and further includes at least one flat surface (12) at the circumference surface of the monofilament (10), said flat surface (12) being arranged orthogonal to the first width (W11) and parallel to the second width (W12), and wherein the flat surface (12) of the monofilament (10) is arranged at the inner side of the helix of the monofilament (10), and the respective flat surfaces at said pair of legs (13) belonging to the same helical unit are arranged to face one another.

In some embodiments, the monofilament (10) may have a flattened shape in which a pair of flat surfaces (12) are formed at the opposite sides in cross section.

In some embodiments, said apparatus may further include a core thread (20) arranged inside the helix of the monofilament (10), the core thread (20) being positioned between the respective flat surfaces (12) at said pair of legs (13) belonging to the same helical unit.

Also disclosed is a slide fastener that includes:

a pair of fastener stringers of any one of said fastener stringers;

a fastener slider (920) that engages and disengages a pair of fastener elements (912) respectively provided at the pair of fastener stringers.

Advantageous Effects of Invention

According to an aspect of the present invention, the reduced weight of a slide fastener may be facilitated.

DESCRIPTION OF EMBODIMENTS

Hereinafter, embodiments of the present invention will be described with reference to drawings. Respective embodiments are not mutually exclusive, and the skilled person could properly combine them without requiring excess descriptions and could understand the synergic effect by such combinations. Overlapping descriptions among embodiments will basically be omitted. Referenced drawings are mainly for the purpose of illustrating the invention and may be simplified in an appropriate manner.

First Embodiment

Figure 1:
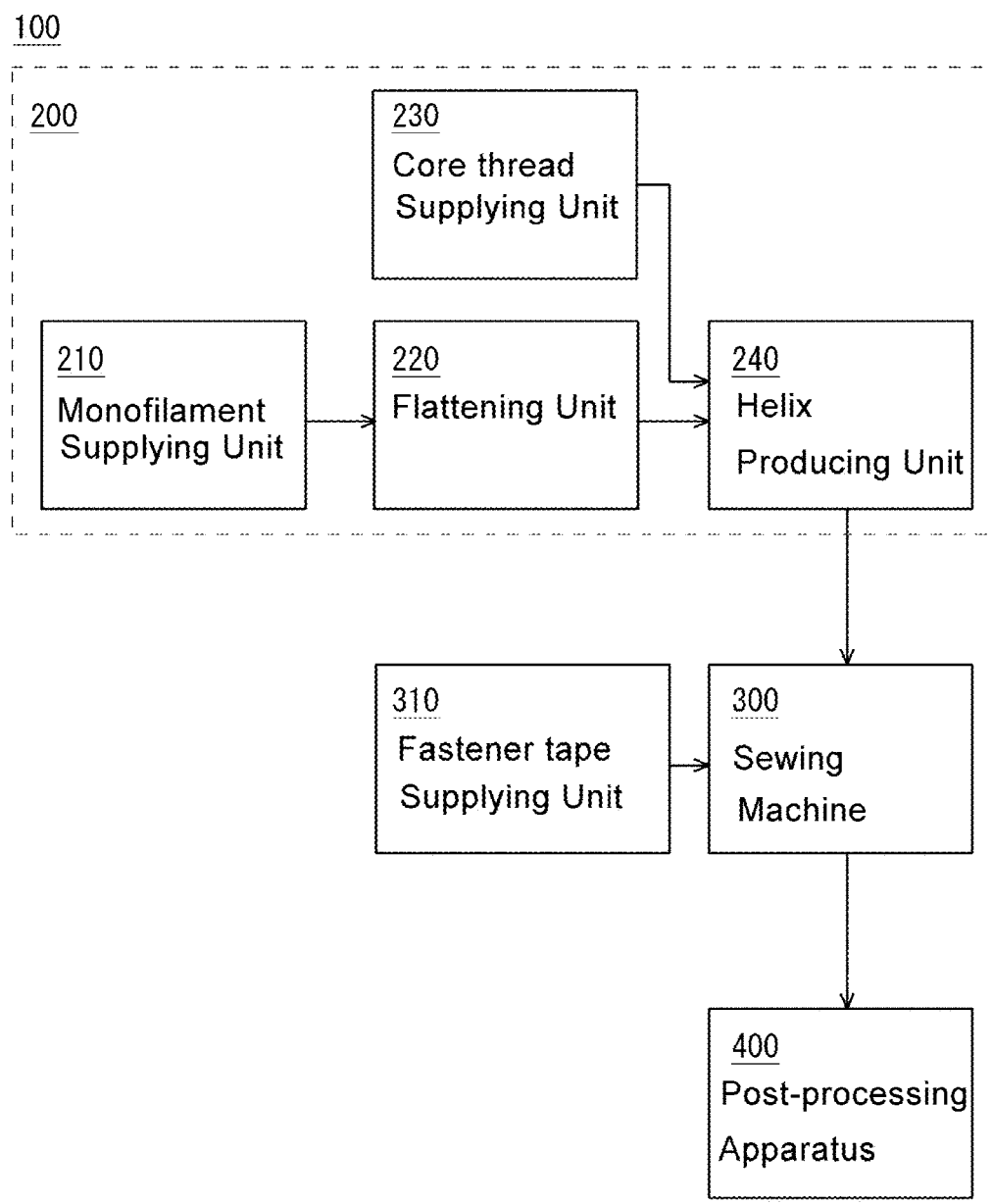
FIG. 1 is a block diagram illustrating a schematic configuration of an apparatus for producing a fastener stringer, according to a first embodiment of the present invention.
Figure 2:
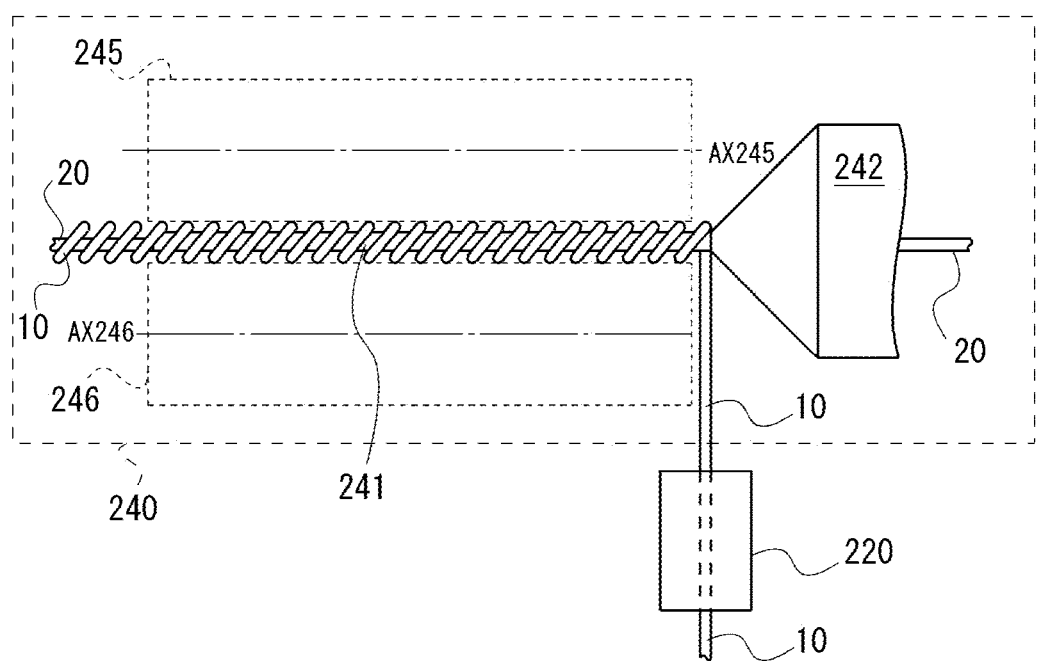
FIG. 2 is a schematic view illustrating a schematic configuration of an apparatus for producing a fastener element according to a first embodiment of the present invention, and is a schematic top view of the fastener element producing apparatus placed on a stage.
Figure 3:
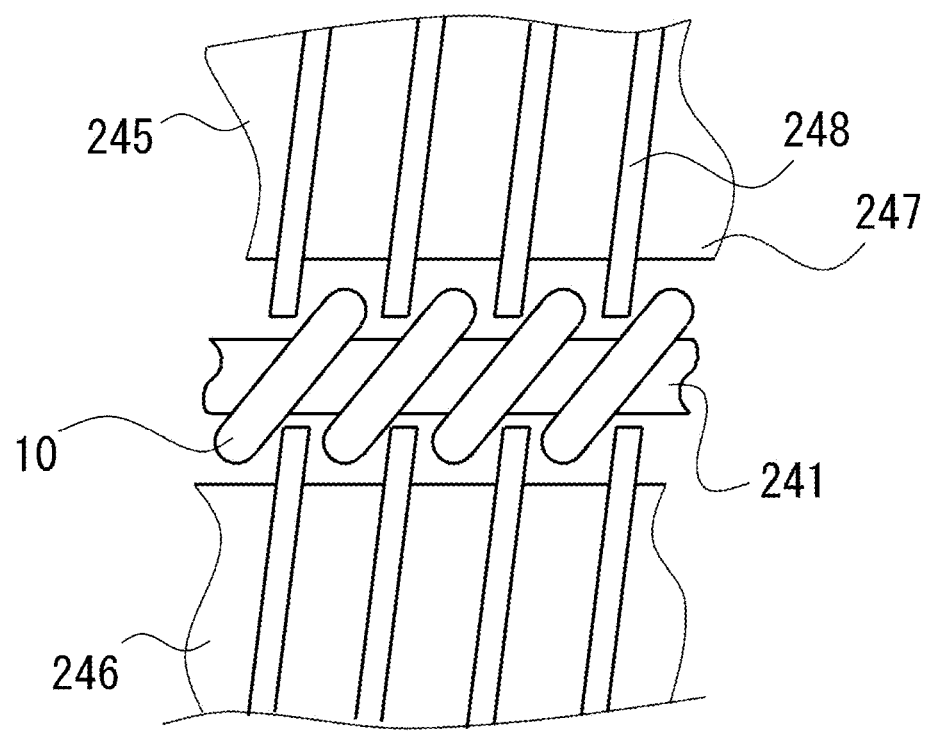
FIG. 3 is a view illustrating a conveyor mechanism for a helical monofilament in the apparatus for producing a fastener element according to a first embodiment of the present invention.
Figure 4:
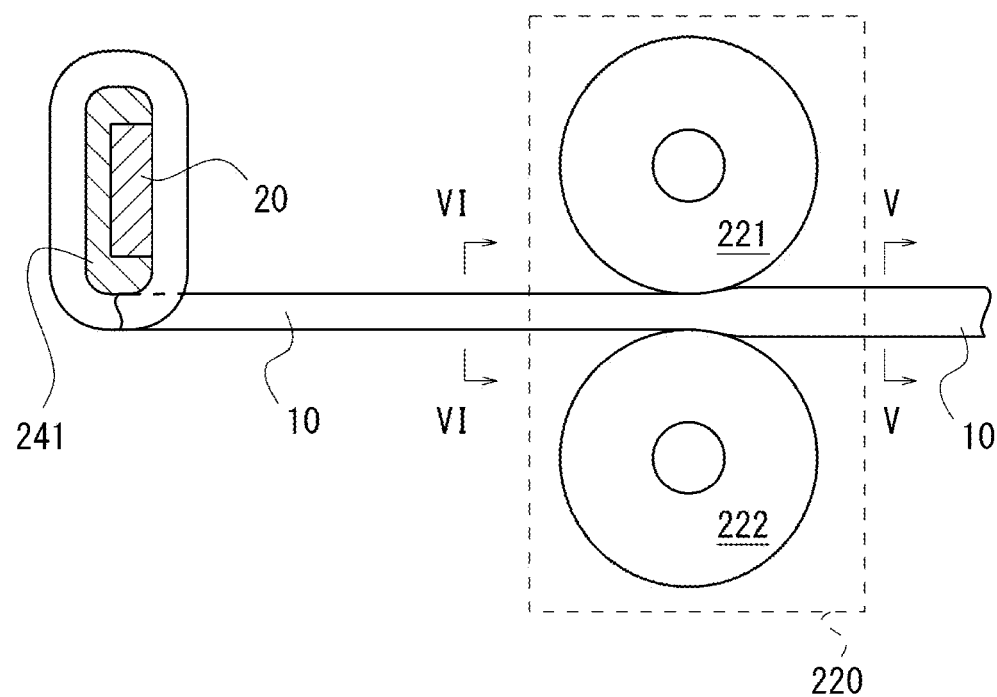
FIG. 4 is a schematic view illustrating a configuration of a flattening unit of the apparatus for producing a fastener element according to a first embodiment of the present invention, the manner of a flattened monofilament wound about a mandrel being illustrated together.
Figure 5:
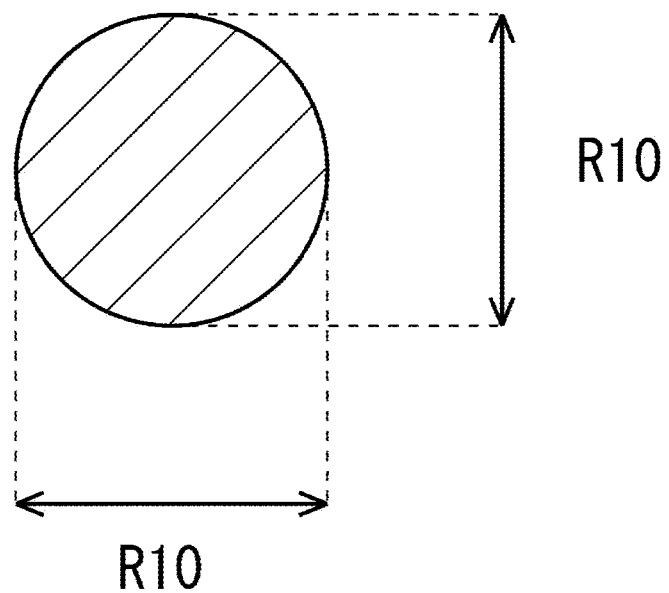
FIG. 5 is a schematic view illustrating the sectional shape of a monofilament along V-V in FIG. 4.
Figure 6:
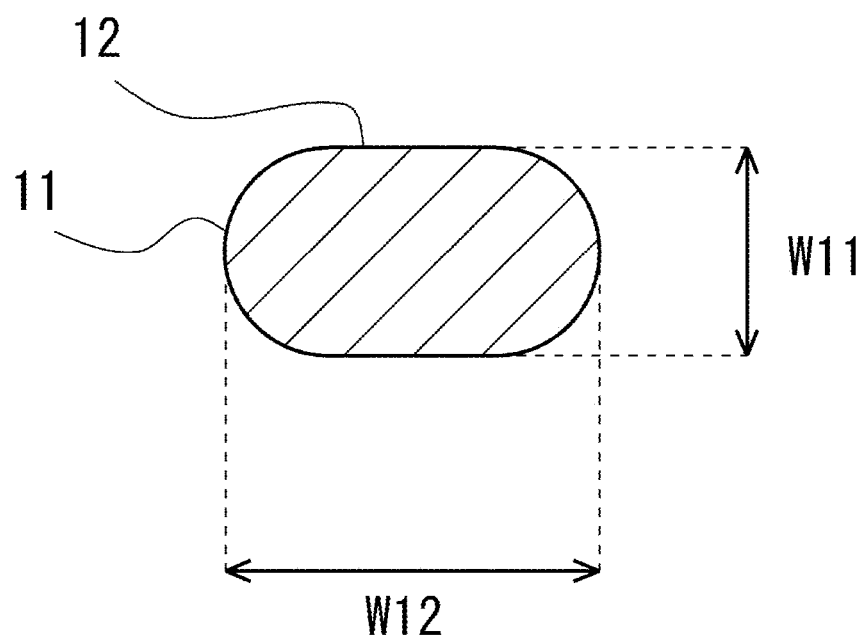
FIG. 6 is a schematic view illustrating the sectional shape of a monofilament along VI-VI in FIG. 4.
Figure 7:
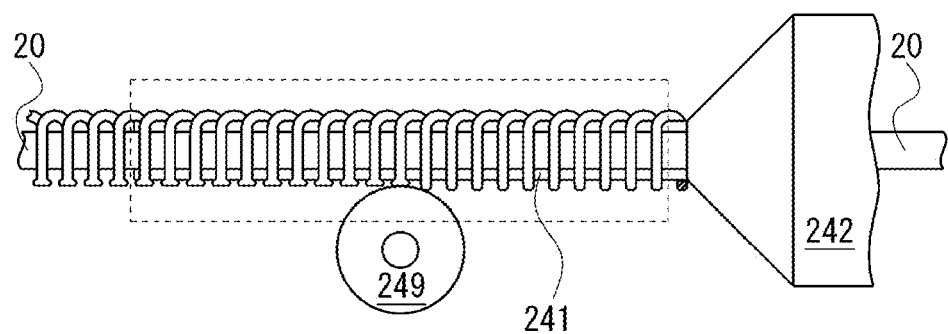
FIG. 7 is a schematic view illustrating a schematic configuration of the apparatus for producing a fastener element according to a first embodiment of the present invention, and is a schematic side view illustrating the fastener element producing apparatus placed on a stage.
Figure 8:
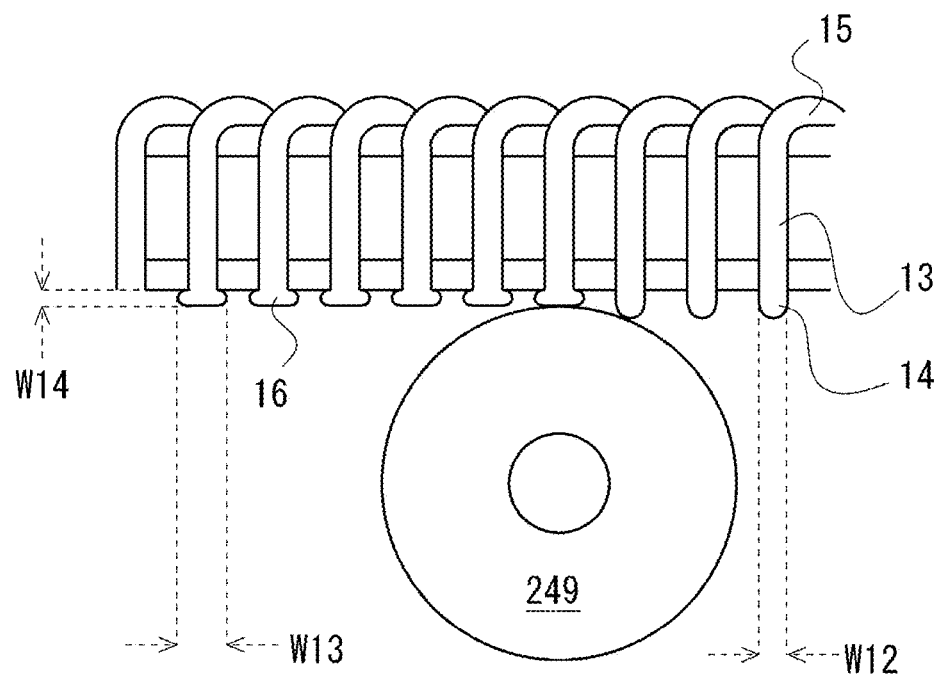
FIG. 8 is a schematic expanded view of a part of FIG. 7, illustrating in an expanded manner how engaging heads are formed by a press roll.
Figure 9:
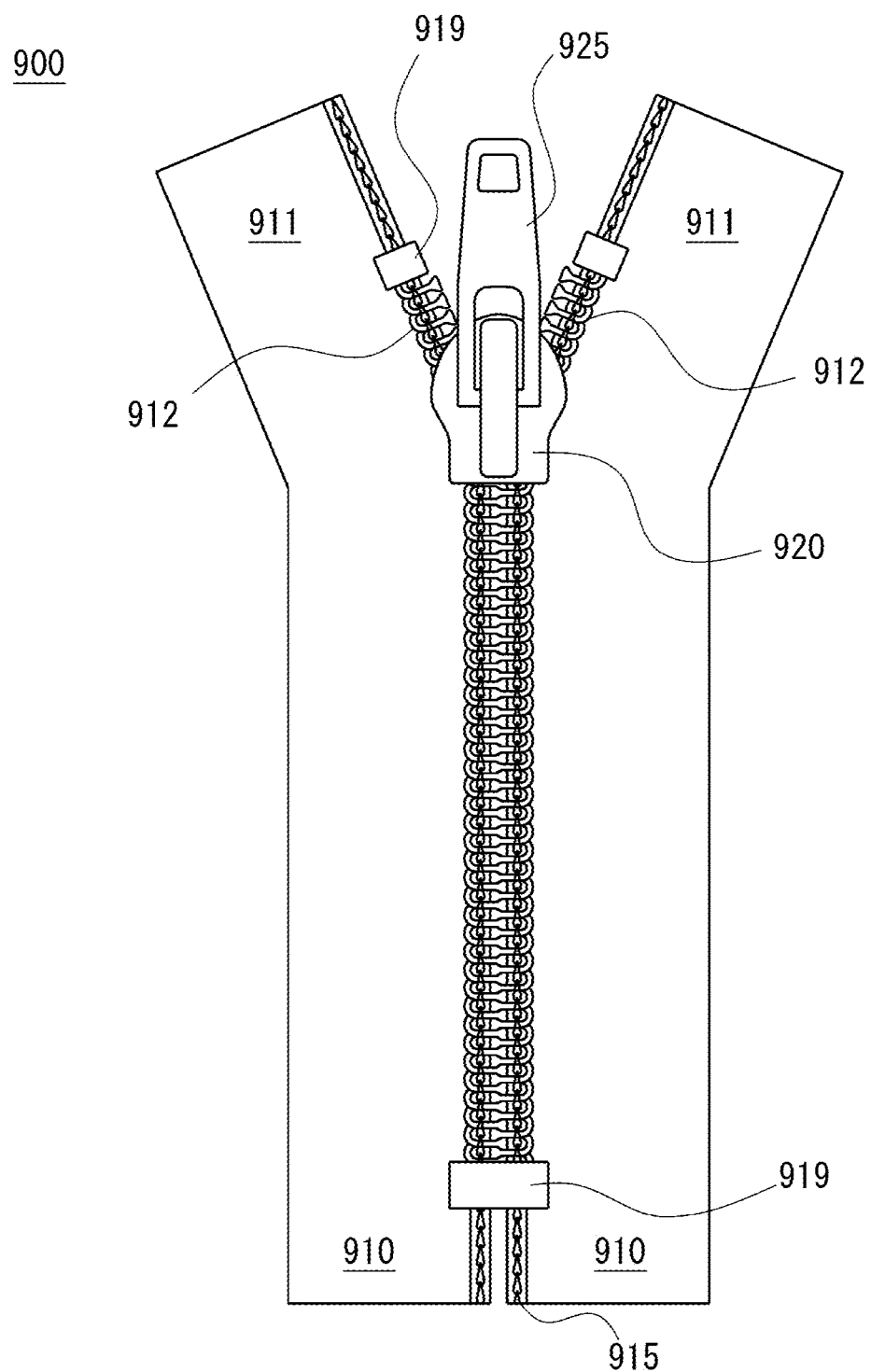
FIG. 9 is a schematic top view of a slide fastener according to a first embodiment of the present invention.
Figure 10:
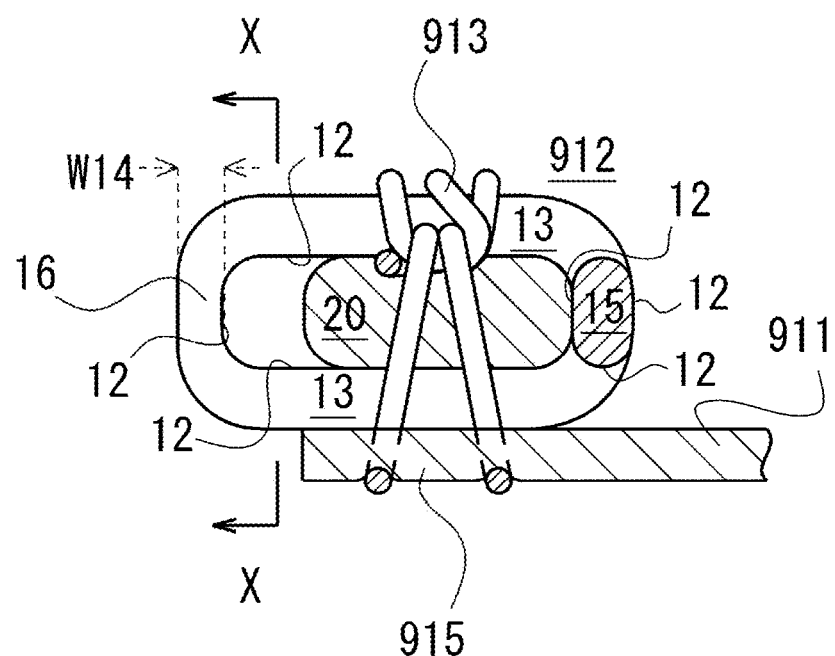
FIG. 10 is a schematic partial sectional view of a fastener stringer according to a first embodiment of the present invention.
Figure 11:
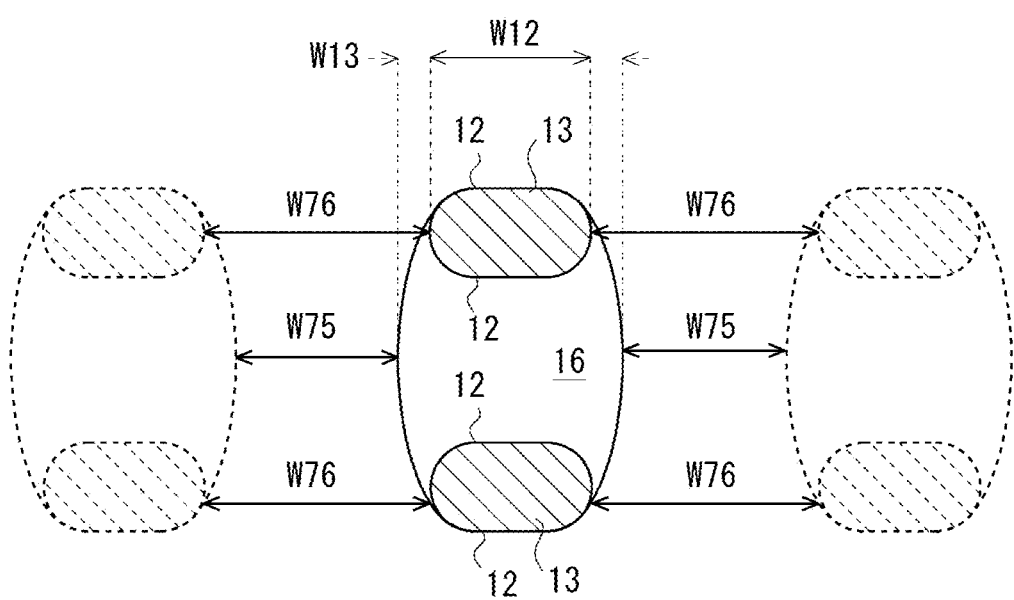
FIG. 11 is a sectional view along X-X in FIG. 10 and, for a convenience of explanation, corresponding sections of adjacent helical units are illustrated together.

A first embodiment will be discussed with reference to FIGS. 1 to 12. FIG. 1 is a block diagram illustrating a schematic configuration of an apparatus for producing a fastener stringer. FIG. 2 is a schematic view illustrating a schematic configuration of an apparatus for producing a fastener element, and is a schematic top view of the fastener element producing apparatus placed on a stage. FIG. 3 is a view illustrating a conveyor mechanism for a helical monofilament in the apparatus for producing a fastener element. FIG. 4 is a schematic view illustrating a configuration of a flattening unit of the apparatus for producing a fastener element according to a first embodiment of the present invention, the manner of a flattened monofilament wound about a mandrel being illustrated together. FIG. 5 is a schematic view illustrating the sectional shape of a monofilament along V-V in FIG. 4. FIG. 6 is a schematic view illustrating the sectional shape of a monofilament along VI-VI in FIG. 4. FIG. 7 is a schematic view illustrating a schematic configuration of the apparatus for producing a fastener element, and is a schematic side view illustrating the fastener element producing apparatus placed on a stage. FIG. 8 is a schematic expanded view of a part of FIG. 7, illustrating in an expanded manner how engaging heads are formed by a press roll. FIG. 9 is a schematic top view of a slide fastener. FIG. 10 is a schematic partial sectional view of a fastener stringer. FIG. 11 is a sectional view along X-X in FIG. 10 and, for a convenience of explanation, corresponding sections of adjacent helical units are illustrated together. FIG. 12 is a schematic comparative view regarding a fastener element according to a comparative embodiment and a fastener element according to an embodiment of the present invention.

As described at the beginning, it has been requested to respond to a demand of reduced weight of a slide fastener. For this technical problem, the present inventors have investigated how to reduce the amount of helical fastener element included in a unit of length of a fastener stringer. As an outcome, the investigation found a technical significance of a method of using a monofilament having a flattened shape in cross-section and widening the elongated width (a second width W12 described below) of the flattened monofilament in cross-section to form an engagement head. Accordingly, the interval between monofilament portions when a monofilament is being helically wound may be widened; the interspace between the legs belonging to adjacent helical units may be widened; and the reduction of weight of fastener element, in turn the reduction of weight of slide fastener may be facilitated.

In this improved fastener stringer, the weight of fastener element included in a unit of length of fastener stringer is less than the weight of fastener element included in a unit of length of previous non-improved fastener stringer of the same kind. Even in this case, sufficient engagement power may be easily ensured, as the engagement head has a widened width (a third width W13 described below) of the elongated width of the monofilament in the width direction of the elongated width.

Simply decreasing the filament-width of the monofilament might possibly make it difficult to maintain the endurance of the fastener element, and degradation in an ability to maintain the closed state of the slide fastener might be visible. Even simply increasing the interval of monofilament portions when the monofilament is being helically wound, widening the filament-width of the monofilament in order to have a wider engagement head may be required. As a result, it might be not possible to facilitate the reduction of weight.

As illustrated in FIG. 1, an apparatus 100 for producing a fastener stringer may include an apparatus for producing a fastener element 200, a sewing machine that sews a fastener element onto to a fastener tape supplied from a fastener tape supplying unit 310, and optionally a post-processing apparatus 400 which may perform cutting, integral formation of a stop, dyeing and so on if so required.

The apparatus for producing a fastener element 200 may include a monofilament supplying unit 210, a flattening unit 220, a core thread supplying unit 230, and a helix producing unit 240. The monofilament supplying unit 210 may be an apparatus that supplies a monofilament and, for example, may be a spool about which a monofilament is wound. The monofilament may be a flexible linear member made of a synthetic resin, and any specific material may be used for the monofilament. The flattening unit 220 may be an apparatus that performs a flattening process for the monofilament. The core thread supplying unit 230 may be an apparatus that supplies a core thread, and may be a bobbin about which a core thread is wound, for example. The core thread may be a flexible thread made of a number of bound and twisted yarns, for example.

The helix producing unit 240 may be an apparatus that produces a helix by configuring the filament into a helical shape, and may be configured to include a mandrel as described below. The fastener tape supplying unit 310 may be an apparatus that supplies a fastener tape that has already been woven, and may be a spool about which a fastener tape is wound, for example. The sewing machine 300 may be a normal sewing machine for industrial use. The post-processing apparatus 400 may be an apparatus that performs an optional post-processing as described above, and may include a cutting apparatus, stop forming apparatus, dyeing apparatus and so on, for example.

As illustrated in FIG. 2, the helix producing unit 240 may include a mandrel 241, and a mandrel holder 242. The mandrel 241 may be an axial member extending in a given direction. The mandrel 241 may be a rod having a sectional shape having an elongated width and a shortened width orthogonal to the elongated width, such as a rectangular sectional shape, oval sectional shape and so on. The mandrel 241 may be provided with a groove extending in the axial direction of the mandrel 241, and the core thread 20 may be supplied to this groove, not necessarily limited though. The monofilament 10 may be helically wound about the mandrel 241 so that the core thread 20 may be provided inside the helix of monofilament, thereby ensuring a higher producing efficiency.

The mandrel holder 242 may be a support that supports the mandrel 241, and may also be an intermediate member for the supply of the core thread 20 to the mandrel 241. The mandrel holder 242 may be a solid member including a conical end and a tubular body.

Various manners may be envisaged for helically winding the monofilament 10 about the mandrel 241. In a non-limiting embodiment, a pair of screws 245, 246 may be provided such that the respective rotational axes AX245, AX246 are arranged parallel to the axial direction of the mandrel 241 as illustrated in FIG. 2, and the rotation of each screw may helically wind the monofilament 10 about the circumference surface of the mandrel 241. At this instance, the mandrel 241 may be stationary, and could be said as a stationary member in relation to the rotational members of the screws. The screws 245, 246 rotate in the same direction such that the monofilament 10 is helically transferred about the circumference surface of the mandrel 241. As illustrated in FIG. 3, each screw 245, 246 is provided with a vane 248 helically wound about the circumference surface of the shaft 247 at constant interval. The interspace between vanes in the screw 245, 246 may be increased more than normal so that the interval between helical units in the monofilament 10 may be increased more than normal.

As illustrated in FIG. 2, the monofilament 10 may be supplied to the mandrel 241 after the monofilament 10 has been flattened by the flattening unit 220. The monofilament 10 may be shaped, from a circle in cross-section, to be flattened in cross-section by the flattening unit 220.

As illustrated in FIG. 4, the flattening unit 220 may include a pair of press rolls 221, 222. The monofilament 10 may be supplied to a slit between the press rolls 221, 222. The press rolls 221, 222 rotate in an opposite direction to transfer the mandrel 241 toward the mandrel 241 so that the monofilament 10 may be pressed to be flattened in cross-section from a circle in cross section. The slit between the press rolls 221, 222 is set to be slightly less than the diameter of the monofilament 10 having a circular cross-sectional shape. The press rolls 221, 222 may be warmed if so required, and the monofilament 10 may be warmed while being shaped.

As illustrated in FIGS. 5 and 6, the circular sectional monofilament 10 having a diameter R10 may be shaped to be a flattened sectional monofilament 10 having a first width W11 and a second width W12. Note that the first width W11 and the second width W12 are mutually orthogonal. A pair of flat surfaces 12 and a pair of curved surfaces 11 are formed at the circumference surface of the monofilament 10. The first width W11 may be a width in a direction orthogonal to the flat surface 12, and the second width W12 may be a width in a direction parallel to the flat surface 12. Under a broad meaning, the flattened shape may be a non-circular shape or any shape having the first width W11 and the second width W12. According to this interpretation, the flattened shape may include an oval shape or a shape similar to this oval shape. The flattened shape may include a shape provided with a pair of flat surface as illustrated in FIG. 6. The illustrated shape in FIG. 6 is provided with a flat surface, and thus this could be said as a non-oval shape.

As described above, the monofilament 10 may be pressed by the press rolls 221, 222 from both directions. A flat surface 12 continuously extending in a longitudinal direction of the monofilament 10 may be formed at the circumference surface of the monofilament 10. Corresponding to the pair of press rolls 221, 222, a pair of flat surfaces 12 may be formed at the circumference surface of the monofilament 10. These flat surfaces 12 are arranged at the opposite sides one another. In another embodiment, one press roll may be employed and one flat surface may be formed at the monofilament 10.

The formation of the flat surface 12 at the monofilament 10 can be regulated by selecting a material of monofilament, the load applied to the monofilament by the press roll, the time period during which a load is applied to the monofilament by the press roll, a temperature of the press roll and so on. The formation of the flat surface at the monofilament 10 might be beneficial also in maintaining an intended orientation of the monofilament 10 about the mandrel 241.

In a non-limiting exemplary embodiment, the orientation of the monofilament 10 about the mandrel 241 may be regulated. As would be understood from an example of FIG. 4, the monofilament 10 may be supplied to the mandrel 241 while the second width W12 of the monofilament 10 is oriented along, i.e. parallel to the axial direction of the mandrel 241. Also, the monofilament 10 may be supplied to the mandrel 241 while the first width W11 of the monofilament 10 is orthogonal to the axial direction of the mandrel 241. As a result, the second width W12 of the monofilament 10 may be oriented along, i.e. parallel to the axial direction of the mandrel 241. As a result, the first width W11 of the monofilament 10 may be oriented orthogonal to the axial direction of the mandrel 241.

In a case illustrated in FIG. 4, the above described manner, in which the second width W12 of the monofilament 10 is parallel to the axial direction of the mandrel 241 and the first width W11 of the monofilament 10 is orthogonal to the axial direction of the mandrel 241, is maintained in the whole way from the flattening unit 220 to the mandrel 241, requiring no intermediate apparatus between the flattening unit 220 and the mandrel 241. The skilled person might find this configuration preferable.

As illustrated in FIGS. 7 and 8, the helical winding of the monofilament 10 about the mandrel 241 may be achieved and the monofilament 10 may be in a helically wound state along the axial direction of the mandrel 241. At this moment, the helical units in the helix of monofilament 10 may be arranged along the axial direction of the mandrel 241. The helical unit in the helix of monofilament 10 may include a pair of legs 13, a first coupling portion 14, and a second coupling portion 15. The pair of legs 13 may be coupled by the first coupling portion 14. One of the pair of legs 13 is coupled, by the second coupling portion 15, to the other leg 13 belonging to an adjacent helical unit.

In a condition in which the monofilament 10 is helically wound about the mandrel 241, there can be a distortion in the monofilament 10 due to the helical turning thereof. However, in a case in which a single monofilament 10 is to be wound about the mandrel 241, the monofilament 10 may not be pressed by an external force, and thus each of the legs 13, the first coupling portion 14, and the second coupling portion 15 may maintain the flattened sectional shape illustrated in FIG. 6, i.e. maintain to have the first width W11 and the second width W12.

The helical monofilament 10 may be transferred away from the mandrel holder 242 in the axial direction of the mandrel 241 by the rotation of the screws. As illustrated in FIG. 7, a head forming unit 249 is provided adjacent to the mandrel 241 so that the above described first coupling portion 14 may be deformed to be an engagement head 16, and the above described second width W12 may be widened to be a third width W13. Note that the above described first width W11 may be narrowed to be a forth width W14.

Any specific configuration for the head forming unit 249 may be employed. However, in a non-limiting embodiment, at least one press roll 249 may be employed as illustrated in FIGS. 7 and 8. The press roll 249 may be, for example, a roll made of metal which can rotate while receiving a motive power from a motor which is not illustrated in drawings. In an exemplary embodiment, the press roll 249 can displace relative to the mandrel 241, and the size of the engagement head to be formed can be regulated. In another embodiment, a plurality of press rolls may be arranged along the axial direction of the mandrel 241.

A step in which the first coupling portion 14 is pressed and deformed by the press roll 249 may be, in an example, performed under a warmed environment and, in another example, may be performed at a room temperature. In another further example, the press roll 249 may be warmed and the first coupling portion 14 may be pressed and deformed while heat is transmitted to the first coupling portion 14. After the head-formation-process illustrated in FIG. 8, the shape of the fastener element may be fixed by cooling and so on. Then, the obtained fastener element may be supplied to the sewing machine 300 directly after that process or via optional additional processes.

With reference to FIGS. 9 to 11, descriptions will be made for a configuration of a slide fastener using a fastener element and a fastener stringer obtained by the above described production method and production apparatus. When descriptions are made with reference to these drawings, terms indicating a direction may be defined as follows. An up-down direction may be a direction orthogonal to a main surface of a fastener tape. A left-right direction may be orthogonal to the front-back direction and may be a direction along the tape width of a fastener tape. A front-back direction may be a direction orthogonal to the up-down direction and the left-right direction, and may be identical to the move direction of a fastener slider. Redefining of directions may be possible from another point of view based on the following descriptions.

As illustrated in FIG. 9, a slide fastener 900 may have a pair of left and right fastener stringers 910, a fastener slider 920 for opening and closing the pair of left and right fastener stringers 910, and stops 919. Each fastener stringer 910 may include a fastener tape 911 having an elongated direction matching the front-back direction, and a fastener element 912 sewn to the fastener tape 911. The fastener tape 911 may have a side-edge portion 915 being opposed to the other fastener tape 911 of the same pair, and the fastener element 912 may be sewn to this opposed side-edge portion 915. Note that the tape width of the fastener tape 911 is a width parallel to the left-right direction. The length of the fastener tape 911 is a length parallel to the front-back direction.

The fastener tape 911 may be an elongated woven or knitted stuff. The fastener element 912 may be a helix that is formed by the monofilament 10 being helically wound as described above, and in which engagement heads 16 are formed by the deformation of each first coupling portion 14. The core thread 20 runs inside the fastener element 912. The supply of the core thread 20 inside the fastener element 912 may be achieved at the same time when the monofilament 10 is wound about the mandrel 241 at which the core thread 20 has been arranged as described above. The fastener element 912 is sewn to the fastener tape 911 by a thread 913. Stops 919 made of metal or resin may be provided at the front end portion and the back end portion of the fastener element 912.

The fastener slider 920 may be a normal slider that is provided to engaging and disengaging the pair of left and right fastener elements 912. For example, the fastener slider 920 may include an upper wing, a lower wing, and a coupling pillar coupling the upper wing and the lower wing, and maybe provided with a Y-like element passage. The frontward move of the fastener slider 920 may close the pair of left and right fastener stringers 910, and the backward move of the fastener slider 920 may open the pair of left and right fastener stringers 910. Note that the upper wing and lower wing of the fastener slider 910 may respectively be provided with left and right flanges to guide the front and back move of the fastener elements 912 inside the fastener slider 920. A pull 925 maybe attached to a pull attachment pillar at the fastener slider 920.

The fastener stringer 910 is elongated in the front-back direction, and the fastener element 912 and the core thread 20 extend and are elongated in the same direction. The helical unit of the helix of fastener element 912 includes a pair of legs 13, a reversed portion 15, and an engagement head 16. The reversed portion 15 is equal to the above-described second coupling portion, however a different name is used for the sake of explanation. The engagement head 16 is a portion formed from the first coupling portion 14 being deformed as described above. Similar to the first coupling portion, the pair of legs 13 are coupled via the engagement head 16. Similar to the second coupling portion, one of the pair of legs 13 is coupled to the other leg 13 belonging to the adjacent helical unit via the reversed portion 15.

The leg 13 and the reversed portion 15 have a cross-sectional shape equal to the cross-sectional shape of the monofilament 10 flattened by the flattening unit 220. The engagement head 16 has a cross-sectional shape obtained by further deforming and flattening the cross-sectional shape of the monofilament 10 flattened by the flattening unit 220.

The thread 913 is sewn to the fastener tape 911 while the fastener element 912 is placed on the fastener tape 911, and the fastener element 912 is pushed against the fastener tape 911 by the thread 913, thereby ensuring the fixing of the fastener element 912 onto the fastener tape 911.

In the helix of fastener element 912, one of the flat surfaces 12 of the monofilament 10 is oriented at the inner side of the helix so that the respective flat surfaces at the pair of legs 13 belonging to the same helical unit face one another. This is a result of that the flat surface 12 of the monofilament 10 is turned about and along the circumference surface of the mandrel 241 as described with reference to FIG. 4. Note that the inner side of the helix is equal to the side toward the central axis of the helix.

As would be understandable from FIG. 10, the pair of legs 13 include an upper leg 13 and a lower leg 13. The lower leg 13 extends in the tape width direction of the fastener tape 911 which is identical to the left-right direction, and touches the upper surface of the fastener tape 911. The upper leg 13 extends in the tape width direction of the fastener tape 911, and is placed apart from and with no contact to the upper surface of the fastener tape 911. The upper leg 13 and the lower leg 13 at the top and bottom extend in parallel. As illustrated in FIG. 9, when the fastener stringer 910 is viewed from above, it would be not easy to see the lower leg 13 as the lower leg 13 is substantially covered by the upper wing 13.

The upper surface and lower surface of the lower leg 13 are flat surfaces 12 formed at the circumference surface of the monofilament 10. Similarly, the upper surface and the lower surface of the upper leg 13 are flat surfaces 12 formed at the circumference surface of the monofilament 10. The core thread 20 is sandwiched between the lower surface of the upper leg 13 which the flat surface 12 and the upper surface of the lower leg 13 which is the flat surface 12. The circumference surface of the core thread 20 touches the flat surface of the lower leg 13, the flat surface of the upper leg 13, and the flat surface of the reversed portion 15, and does not touch the flat surface of the engagement head 16.

The engagement head 16 has a third width W13 that is a widened width of the second width W12 of each leg 13 in the width direction of the second width W12. This third width W13 is the maximum width of the engagement head 16 in the front-back direction, the elongation direction of the fastener tape, the elongation direction of the fastener element, and the arrangement direction of the helical units. The interspace W75 between the engagement heads 16 in adjacent helical units is narrower than the interspace W76 between the upper legs 13 or the lower legs 13 in adjacent helical units, thereby ensuring that the fastener elements of the paired fastener stringers engage one another preferably.

The second width W12 of the leg 13 is a width along, i.e. parallel to the flat surface 12 of the leg 13. The second width W12 of the leg 13 is a width along, i.e. parallel to the front-back direction. Similarly to this, the third width W13 of the engagement heads 16 is a width along, i.e. parallel to the flat surface 12 of the engagement heads 16, and similar description with respect to the front-back direction will apply. Note that the interspace W75 of engagement heads 16 adjacent in the front-back direction may be referred to as a pitch distance of the engagement head 16. The interspace W76 of the legs 13 adjacent in the front-back direction may be referred to as a pitch distance of the leg 13.

Figure 12A:
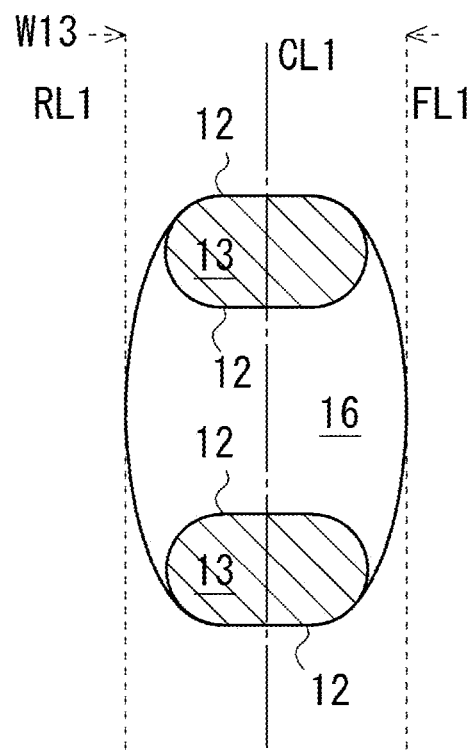
FIGS. 12(a) and 12(b), collectively referred to as FIG. 12, are schematic comparative views regarding a fastener element according to a comparative embodiment and a fastener element according to an embodiment of the present invention.
Figure 12B:
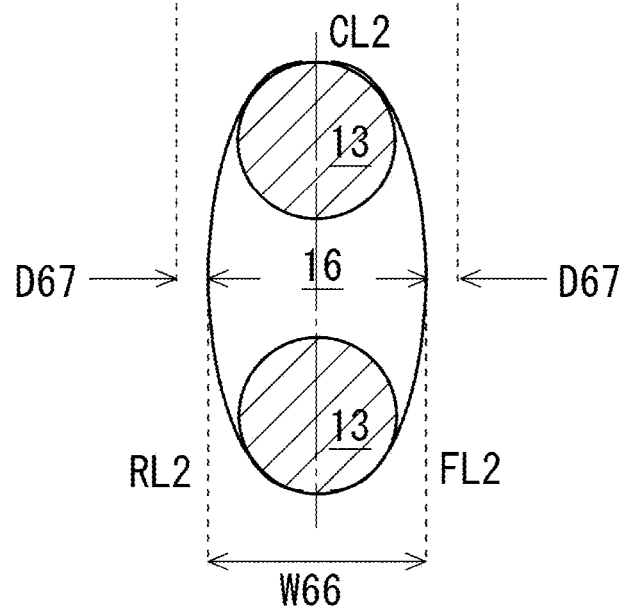

Finally, with reference to FIG. 12, a comparison is presented against a comparative embodiment in which the monofilament 10 is not flattened by the flattening unit 220. FIG. 12(a) illustrates a fastener element that is produced from a monofilament being flattened according to the present embodiment, and FIG. 12(b) illustrates a fastener element that is produced from a monofilament being not processed to be flattened. In FIG. 12, the central line CL1 of the fastener element in the front-back direction shown in FIG. 12(a) is indicated by an alternate long and short dash line in FIG. 12(a), and the central line CL2 of the fastener element in the front-back direction shown in FIG. 12(b) is indicated by an alternate long and short dash line in FIG. 12(b). The central line CL1 and the central line CL2 are coaxially arranged. In FIG. 12(a), the central line is moved parallel frontward so that a front boarder line FL1 passing the frontmost point of the engagement head of the fastener element is defined. Similarly, in FIG. 12(a), the central line is moved parallel backward so that a back boarder line RL1 passing the backmost point of the engagement head of the fastener element is defined. Similar to FIG. 12(a), a front boarder line FL2 and a back boarder line RL2 are defined in FIG. 12(b). Note that, in FIG. 12(a), the maximum width of the engagement heads 16 is defined by the front boarder line FL1 and the rear boarder line RL1. Similarly, in FIG. 12(b), the maximum width of the engagement heads 16 is defined by the front boarder line FL2 and the rear boarder line RL2.

As would be understandable from the comparison of FIG. 12(a) and FIG. 12(b), the maximum width W66 of the engagement head 16 which is parallel to the front-back direction according to the comparative embodiment of FIG. 12(b) is slightly narrower than the third width W13 of the engagement head 16 which is parallel to the front-back direction according to the present embodiment of FIG. 12(a). Note that the relational formula $W13=W66\pm(2*D67)$ is established. Here, D67 is equal to the interspace between the front boarder line FL1 in FIG. 12(a) and the front boarder line FL2 in FIG. 12(b). D67 is equal to the interspace between the back boarder line RL1 in FIG. 12(a) and the back boarder line RL2 in FIG. 12(b).

In the case of comparative embodiment of FIG. 12(b), the pitch distance of the engagement head 16 is necessarily narrower relative to the present embodiment of FIG. 12(a) so that the total weight of the fastener element included in a unit of length of a fastener stringer will be increased, and thus the reduction of weight of a slide fastener will not be facilitated. In contrast, in the present embodiment, the pitch distance of engagement head 16 is increased greater than the comparative embodiment of FIG. 12(b) so that the total weight of the fastener element included in a unit of length of a fastener stringer can be reduced, and thus facilitating the reduction of weight of a slide fastener.

In view of the above teachings, the skilled person could add various modifications to the respective embodiments. The reference numbers introduced in Claims are just for a reference, and should not be used for the purpose of narrowly construing claims.

REFERENCE SIGNS LIST 10 monofilament
20 core thread
900 slide fastener
910 fastener stringer
920 fastener slider
911 fastener tape
912 fastener element
13 leg
14 first coupling portion
15 second coupling portion/reversed portion
16 engagement head
W11 First width
W12 Second width
W13 Third width
W14 Fourth width
220 Flattening unit
240 Helix configuring unit

The invention claimed is:

1. A fastener stringer comprising:
a fastener tape that extends in an elongation direction and includes a side-edge portion; and
a fastener element that extends along the elongation direction and is attached to the side-edge portion, the fastener element comprising a helix of a monofilament that comprises a plurality of helical units, each of the helical units includes a pair of legs, an engagement head, and a reversed portion, wherein a plane including an upper leg is separate from and substantially in parallel with a plane including a lower leg, and wherein
the monofilament includes, in cross section, a first width and a second width being orthogonal to the first width and being greater than the first width,
each leg in each of the helical units includes the second width along the elongation direction, and
the engagement head in each of the helical units includes a third width along the elongation direction, the third width being greater than the second width.

2. The fastener stringer according to claim 1, wherein the monofilament further includes an inner flat surface, said inner flat surface being substantially in parallel to the second width.

3. The fastener stringer according to claim 2, wherein in each of the helical units, the legs have the inner flat surfaces respectively that are arranged to face one another.

4. The fastener stringer according to claim 3, further comprising a core thread that is sandwiched between the inner flat surfaces of the legs in each of the helical units.

5. The fastener stringer according to claim 2, wherein the monofilament has a flattened shape.

6. The fastener stringer according to claim 2, further comprising a core thread arranged inside the helix of the monofilament.

7. The fastener stringer according to claim 1, wherein the monofilament further includes an outer flat surface, said outer flat surface being substantially in parallel to the second width.

8. The fastener stringer according to claim 7, wherein the legs in each of the helical units have the outer flat surfaces respectively that are arranged to face opposite directions.

9. The fastener stringer according to claim 1, further comprising a core thread arranged inside the helix of the monofilament.

10. The fastener stringer according to claim 9, wherein the monofilament has a flattened shape.

11. The fastener stringer according to claim 1, wherein the monofilament has a flattened shape.

12. A slide fastener comprising:
a pair of fastener stringers of claim 1; and
a fastener slider that engages and disengages a pair of fastener elements of the pair of fastener stringers.

\* \* \* \* \*